Feb. 17, 1970  HIDEKAZU ABE ETAL  3,496,025
DEFERRED ACTION BATTERY

Filed May 22, 1967  2 Sheets-Sheet 1

INVENTORS
HIDEKAZU ABE
HIROMICHI SHIBATA
MASASHI TAKEUCHI

By James L. Romans, Jr.
ATTORNEY

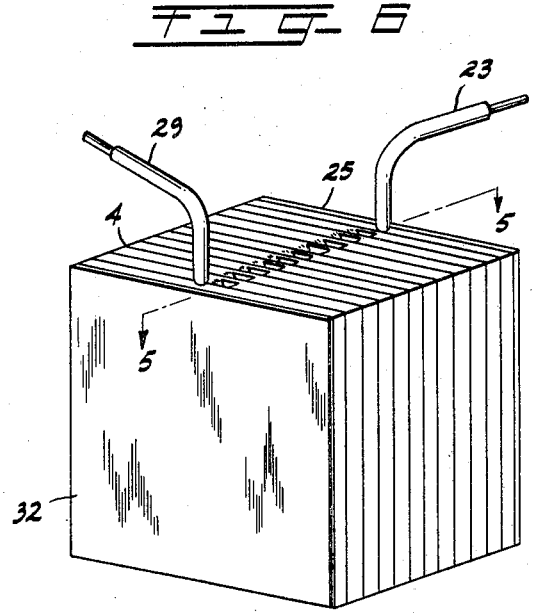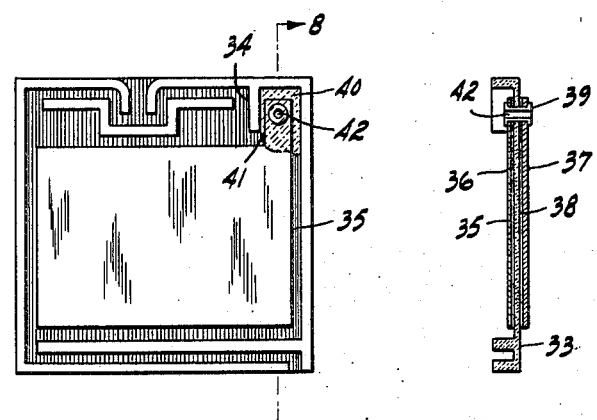

United States Patent Office 3,496,025
Patented Feb. 17, 1970

3,496,025
DEFERRED ACTION BATTERY
Hidekazu Abe, Kyoto, Hiromichi Shibata, Hirakata-shi, and Masashi Takeuchi, Yamashina, Japan, assignors to Japan Storage Battery Co., Ltd. (Nippon Denchi Kabushiki Kaisha), Kyoto, Japan
Filed May 22, 1967, Ser. No. 639,974
Claims priority, application Japan, July 21, 1966, 41/47,810, 41/47,812
Int. Cl. H01m 13/10, 17/06
U.S. Cl. 136—100                    11 Claims

ABSTRACT OF THE DISCLOSURE

A deferred action battery including a series of frame portions each having a window extending therethrough and a corresponding series of electrode assemblies comprising a positive and negative electrode bonded together with a foil layer therebetween. An electrode assembly is mounted on each window to form a plurality of cells within the battery. The battery also includes an upper aperture in the frame to provide an outlet for gas and a lower aperture in the frame to provide an opening for an electrolyte.

BACKGROUND OF THE INVENTION

This invention relates to electrical batteries and in particular to a new and improved deferred action battery. The subject battery may, for example, be of the highly active type employing magnesium and silver chloride electrodes.

While deferred action batteries are known in the prior art and it is conventional to employ magnesium and silver chloride as the chemically active elements of said battery, there exist problems of leakage between cells and deterioration due to atmospheric moisture in such commercially available batteries. A typical deferred action battery comprises a magnesium negative electrode of one cell spaced from a silver chloride positive electrode of a succeeding cell by a silver foil barrier which prevents electrochemical interaction and acts as an electrical conductor between the two members. The negative and positive electrodes are spaced from one another by a small cylindrical or spherical spacer. The battery of the present invention, however, is smaller and simpler to construct since the spacer is eliminated from the design. The subject battery also has improved protection against deterioration due to atmospheric moisture and minimizes leakage between the cells through the single electrolyte during discharge. As a further advantage, the battery also possesses excellent resistance to mechanical shock and vibration.

SUMMARY

The present invention relates to a highly active battery such as a deferred action battery employing magnesium and silver chloride electrodes. The battery comprises a silver chloride electrode which is treated in a reducing bath to provide exposed metallic silver in contact with the silver chloride, a silver foil barrier and a magnesium electrode. The electrodes are in the form of wafers or plates which are bonded together with the silver foil layer therebetween by a conductive cement which may include powdered silver suitable for this purpose. The electrodes are mounted within a frame such that the periphery of a first electrode is mounted about a window portion of the frame closing the window aperture and the other electrode is bonded to the foil layer on the first electrode through the window. A plurality of electrode units are mounted in a unique manner within the frame to form a deferred action storage battery.

It is, therefore, the object of this invention to provide a new and improved deferred action battery.

Another object of this invention is to provide a deferred action battery which is resistant to atmospheric moisture, easily activitated, and minimizes cell leakage.

A further object of this invention is to provide a rugged deferred action battery which is relatively small in size.

A more specific object of this invention is to provide a unique deferred action battery having a silver chloride electrode treated to provide exposed metallic silver, a silver foil barrier, and a magnesium electrode bonded together in a novel battery structure having superior performance characteristics.

With the above and other objects and advantages in view, the present invention relates to a highly active battery such as a deferred action battery employing magnesium and silver chloride electrodes. The battery comprises a silver chloride electrode which is treated in a reducing bath to provide exposed metallic silver in contact with the silver chloride, a silver foil barrier and a magnesium electrode. The electrodes are in the form of wafers or plates which are bonded together with the silver foil layer therebetween by a conductive cement which may include powdered silver suitable for this purpose. The electrodes are mounted within a frame such that the periphery of a first electrode is mounted about a window portion of the frame closing the window aperture and the other electrode is bonded to the foil layer on the first electrode through the window. A plurality of electrode units are mounted in a unique manner within the frame to form a deferred action battery.

The nature of the invention, together with the further novel features thereof, will be readily apparent from the following detailed description when read in conjunction with the accompanying drawings wherein:

FIG. 6 shows the complete battery in condition for storage;

FIG. 7 is a plan view of another embodiment of the invention showing the electrode unit; and FIG. 8 is a cross-sectional view of the electrode unit taken along the line 8—8 of FIG. 7.

Figure 1:
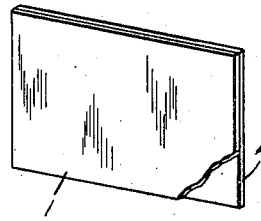
FIG. 1 illustrates a magnesium wafer with a portion cutaway to show the silver foil.

Referring to FIG. 1 of the drawings, a magnesium wafer or plate 1 is coated with a conductive adhesive agent on one side and a layer of silver foil 2 which is free of pin holes is bonded thereto. Good conductivity is obtained by coating the mating surfaces of the magnesium wafer 1 and silver foil 2 with a film of conductive cement. The content of this cement may include, for example, extremely fine silver particles, epoxy resin adhesive and a predetermined quantity of hardener.

Figure 2:
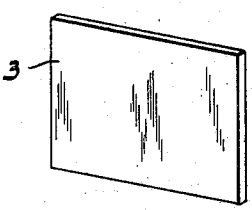
FIG. 2 illustrates a wafer of a material such as fused and rolled silver chloride.

The silver chloride wafer or plate 3 shown in FIG. 2 is formed of fused silver chloride which is flattened by a technique such as rolling. Since silver chloride normally has specific resistivity of the order of several megohms, the resistance of the wafer 3 is too high to use without preparation. Therefore, the surface of the silver chloride wafer 3 is treated in a reducing bath to provide exposed metallic silver in contact with the silver chloride. This promotes rapid cell action after activation of the battery. A particularly effective reducing solution is of the photographic developing type and contains in each liter of aqueous solution, approximately 1.5 grams of hydroquinone, 0.5 gram of P-methylaminophenol sulfate, 6 grams of anhydrous sodium sulfate and 8.5 grams of anhydrous sodium carbonate. The opposite surface of the reduced silver chloride wafer 3 is bonded to another surface of silver foil 2 as shown in FIG. 1 by means of a conductive cement.

Figure 3:
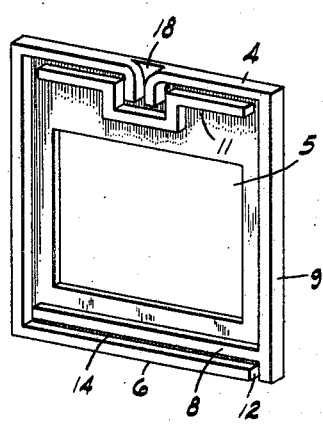
FIG. 3 shows a frame for an electrode unit.
Figure 4:
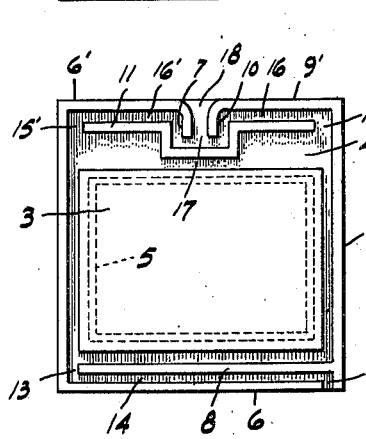
FIG. 4 is a plan view of an electrode unit.
Figure 5:
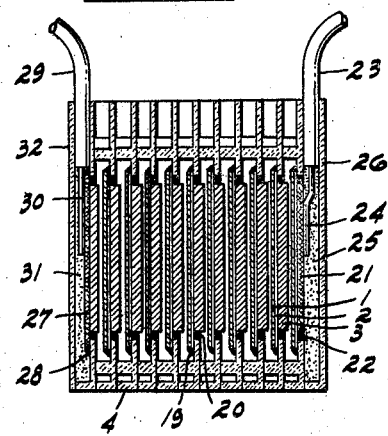
FIG. 5 is a sectional view showing the internal battery arrangement of electrode units taken along the line 5—5 of FIG. 6.

As shown in FIGS. 3, 4 and 5, the frame 4 forming the mounting for the electrode unit is molded from an electric insulating material such as injection molded plastic. The central part of the flat frame includes a window 5 which is slightly larger than the silver chloride plate 3. On the other hand, the silver foil 2 and magnesium wafer 1 are made slightly larger than the window 5. Therefore, when the electrode unit is assembled, the silver chloride wafer 3 is set in the window 5 and the silver foil magnesium wafer assembly is bonded to the inner surface of the frame.

The outer edges of the frame to which the silver foil has been bonded comprises a plurality of rims 6, 7, 9 and 10 which are equally thick but thicker than the electrodes. The cross-piece 8 which is the same thickness as the rim 6 is located in the lower portion of the frame 4 a slight distance from the rim 6 and thus provides a channel 14 for the electrolyte. The rims 6' and 9' in the upper portion of the frame 5 are bent slightly at the top to provide an opening 18. The substantially U-shaped cross-piece 11 having the same thickness as the rims is spaced a predetermined distance from the rims 6' and 9', and thus provides a pair of channels 16 and 16' for the gas generated due to cell action. In the lower portion of the frame 4, the channel 14 formed by rims 6, 9 and cross-piece 8 opens to the outside of the battery through cavity 12 and opens into the electrodes through cavity 13. In the lower portion of the frame 4, the channel 14 formed by rims 6, 9 and cross-piece 8 opens to the outside of the battery through cavity 12 and opens into the electrodes through cavity 13. In the upper portion of the frame 4, the channel 16, 16' formed by rims 6', 9' and cross-piece 11 opens into the electrodes through cavities 15 and 15'; and opens to the outside through channels 16 and 16' which lead to cavities 17 and 18.

The entire periphery of the magnesium wafer 1 and silver foil 2 is adhered to the frame 4 by means of adhesive 19 and the clearance between the silver chloride wafer 3 and the window of the frame is filled with adhesive 20 as shown in FIG. 5. This adhesive may be epoxy resin, a high melting point wax or any other suitable adherent insulating compound.

A battery having multi-cells may be readily formed by bonding surfaces of rims 6, 7, 9 and 10 and cross-pieces 8 and 11 to the corresponding portions of an adjacent cell. Thus, it is possible to combine the cells of the present invention in a unique manner to form a battery having a predetermined output.

The output terminals 23 and 29 of the battery comprise lead wires 24 and 30 which are soldered to conductive plates 21 and 27 and bonded with silver foil therebetween to the electrode of the corresponding end frame. The conductive plates 21 and 27 and the frame portions are bonded as shown at 22 and 28. The insulating materials 25 and 31 are placed around the lead wires 24 and 30, respectively and the plastic plates 26 and 32 are cemented to the outside of the end frames.

The entire battery may be stored in the state shown in FIG. 6 for a considerable time without deteriorating. The battery is then prepared for use by soaking it in water, salt water or any other suitable electrolyte. In this condition, the battery will operate for several hours with the exact length of time depending, of course, on the current drain. The electro-chemical cell action which occurs when the battery is soaked in the electrolyte involves the activation of the magnesium and silver chloride battery elements. The silver foil 2 and the plastic frame 4 are chemically inert and the conductive plates 21 and 27 and lead wires 24 and 30 are protected by the insulating material 25 and 31 and the plastic end plates 26 and 32.

The electrolyte finds ready access to the electrodes through cavity 12 in the lower portion of the battery. The hydrogen gas which is generated at the magnesium electrode due to a sub-reaction caused by the cell activity is discharged through aperture 18 in the upper portion of the battery. The gas flows through cavities 15 and 15' in the upper part of the electrodes and then through the corresponding channels 16 and 16' to the aperture 18.

Since the channel for electrolyte flow has less sectional area and a longer path than prior art batteries, leakage current through the electrolyte is very small. Furthermore, the channel in the upper portion of the battery is filled with hydrogen gas during the cell action so that leakage does not occur in this portion of the battery.

FIGS. 7 and 8 show another embodiment of the electrode unit of the present invention. The sheet 33 which separates the electrodes is similar to the frame 4 of FIG. 3 but it does not have a window in the central portion thereof. On the other hand, a longitudinal downwardly extending rim 34 is provided in order to mount an upwardly extending portion of the sheet 33 therein. The negative electrode 35 and the positive electrode 37 are bonded to opposite surfaces of the sheet 33 by means of an adhesive 36 and 38 such as epoxy resin or the electrodes may be mounted to the sheet 33 by means of rivets of insulating material at several points.

At the upper side portion of the sheet 33, which is within the pocket 41 formed by the longitudinal rim 34, a small hole 42 is provided which extends through the negative electrode 35, sheet 33 and positive electrode 37. This hole 42 permits joining the aforementioned members 35, 33 and 37 by means of a conductive eyelet or rivet 39. The rivet 39 may be made of annealed copper or silver which transmits current from the anode of one cell to the cathode of an adjacent cell. The entire area about the pocket including the co-joined parts is covered with adhesive such as epoxy resin 40. The above construction is also suitable, if, for example, lead chloride in powder form is used as the active material for the positive electrode, that is, when the positive electrode comprises a lead alloy grid having a lead chloride powder pasted and formed into the plate. When this particular type of electrode unit is used in a battery, it may be desirable to provide several rod spacers longitudinally arranged on the electrode surface.

What has been described above are merely illustrative examples of the application of the principles of this invention. While, for example, the active materials used in the illustrative cell are magnesium and silver chloride, other electrode materials may be used advantageously. Also, numerous other arrangements may be readily devised by those skilled in the art which will embody the principles of the invention and fall within the spirit and scope thereof.

What is claimed is:

1. In a battery, the combination comprising; a plurality of frames, each of said frames being formed of an electrically insulative material and having a window extending therethrough and a rim portion extending therefrom along the outer edge thereof, first means cooperating with said rim portion to form a channel at the upper part of said frame, a cavity extending through said rim portion into communication with said channel to provide an outlet for gas generated during operation of the battery, second means cooperating with said rim portion to form a second channel at the lower part of said frame, a cavity extending through said rim portion into communication with said second channel to provide an opening for the battery electrolyte, a negative electrode, a layer of conductive foil bonded to said negative electrode and said combination being mounted over said frame window, and a positive electrode mounted within the frame window in juxtaposition with the layer of conductive foil.

2. The combination in accordance with claim 1 wherein, the negative electrode comprises a magnesium plate, the positive electrode comprises a silver chloride plate, and the conductive foil comprises a layer of silver foil.

3. The combination in accordance with claim 1 wherein, the rim portion is uniformly greater in dimension than the electrodes and is adapted to be bonded to the frame of an adjacent electrode unit to form a multi-cell arrangement.

4. The combination in accordance with claim 1 wherein, said first means comprise a generally U-shaped member spaced from said rim portion at the upper part of said frame to provide said channel, and said second means comprise a member spaced from said rim portion at the lower part of said frame to provide said second channel.

5. A deferred action battery comprising:
a plurality of electrode mounting units each comprising a frame of electrically insulative material having a window extending through a central portion thereof, a rim extending about the outer edge of said frame and having a cavity in the upper rim portion of the frame and a cavity in the lower rim portion of the frame,
an upper cross-piece mounted to the frame opposite the upper rim, said cross-piece providing a channel to the cavity in conjunction with the upper rim for the gas generated by the battery, a lower cross-piece extending from one of the side rims in a spaced relationship with the lower rim to provide a channel for the electrolyte to the electrodes through the cavity,
a plurality of electrode units each comprising:
a negative electrode, a layer of conductive foil bonded to one surface of the negative electrode and said combination being mounted over the window in the frame with the foil surface being exposed through said window and a positive electrode being mounted within the window and in juxtaposition with the conductive foil, and battery output means comprising a pair of terminals each mounted to an opposite electrode on different ends of the battery and means sealing said terminals within the battery.

6. A deferred action battery in accordance with claim 5 wherein:
the rim portion of the frames is thicker than the electrode units mounted within said frames, said rim portions spacing apart the opposite electrodes of adjacent electrode units.

7. A deferred action battery in accordance with claim 5 wherein:
the upper rim includes a downwardly extending portion at the upper cavity, and
the upper cross-piece includes a substantially U-shaped portion with the downwardly extending portion of the upper rim projecting down into said U-shaped portion.

8. A deferred action battery comprising:
a separating sheet of electrically insulative material having a rim portion along the outer edge thereof, first means cooperating with said rim portion to form a channel on the lower portion of said sheet, a cavity extending through the rim portion on the lower part of said sheet into communication with said channel to provide access for an electrolyte, second means cooperating with said rim portion to form a second channel on the upper portion of said sheet, a cavity extending through the rim portion on the upper part of said sheet into communication with said second channel to provide an outlet for gas generated during activation of the battery, a hole extending through said sheet,
a positive electrode bonded to one surface of said sheet and having a hole extending therethrough in alignment with the hole in said sheet, a negative electrode bonded to the outer surface of said sheet and having a hole extending therethrough in alignment with the hole in said sheet, and a conductive eyelet positioned within the aligned holes in the electrode and the sheet and joining said members, and battery output means mounted to said electrodes.

9. A deferred action battery in accordance with claim 8 wherein, said first means comprise a substantially U-shaped cross member mounted to the sheet with the base of said U-shaped portion being positioned opposite the cavity in the rim, and said rim extending downwardly into the U-shaped portion to form the walls of said cavity, said second means comprise a cross member mounted to one of the side rims and located opposite the rim portion at the lower part of said frame to form said second channel in cooperation therewith for the electrolyte, and said sheet includes a member extending downwardly from the upper rim portion to form a pocket and the electrodes include upwardly projecting portions including the holes for mounting to said sheet within the pocket.

10. A deferred action battery in accordance with claim 8 wherein:
a plurality of individual sheet and electrode units are stacked in alignment with the rim portion of one sheet being bonded to an adjacent sheet, said rims spacing the electrodes of adjacent electrode units a predetermined distance apart.

11. A deferred action battery in accordance with claim 8 wherein:
the negative electrode material is selected from the group consisting of zinc and magnesium, and
the positive electrode material is selected from the group consisting of lead chloride, cuprous chloride, mercurous oxide and mercuric chloride.

References Cited

UNITED STATES PATENTS

| | | | |
|---|---|---|---|
| 2,727,082 | 12/1955 | Chubb et al. | 136—90 |
| 2,806,895 | 9/1957 | Dines | 136—90 |
| 2,939,900 | 6/1960 | Jones et al. | 136—91 |
| 2,942,053 | 6/1960 | Baldwin et al. | 136—36 |
| 2,964,583 | 12/1960 | Fafa et al. | 136—91 |
| 2,981,780 | 4/1961 | Burnette | 136—90 |
| 3,050,576 | 8/1962 | Comanor | 136—6 |
| 3,148,090 | 9/1964 | Saslow | 136—100 |
| 3,242,009 | 3/1966 | Schilke | 136—102 |
| 3,257,240 | 6/1966 | Fasola | 136—100 |
| 3,352,717 | 11/1967 | Burant et al. | 136—90 |

ALLEN B. CURTIS, Primary Examiner

C. F. LEFEVOUR, Assistant Examiner

U.S. Cl. X.R.

136—90, 120